United States Patent [19]

Mozayeny

[11] Patent Number: 4,872,105
[45] Date of Patent: Oct. 3, 1989

[54] CURVE FOLLOWING APPARATUS

[75] Inventor: Bahram Mozayeny, Edina, Minn.

[73] Assignee: VectorVision Corporation, Edina, Minn.

[21] Appl. No.: 23,160

[22] Filed: Mar. 9, 1987

[51] Int. Cl.⁴ ............................................. G05B 19/19
[52] U.S. Cl. ............................ 364/167.01; 364/474.03; 250/202; 318/577
[58] Field of Search ................ 364/167, 171, 188, 189, 364/191–193, 474, 475, 513; 318/568, 577; 250/202

[56] References Cited

U.S. PATENT DOCUMENTS

| | | | |
|---|---|---|---|
| 4,319,331 | 3/1982 | Elbaum et al. | 364/515 |
| 4,321,682 | 3/1982 | Koshikawa | 364/520 |
| 4,396,832 | 8/1983 | Henderson | 250/202 |
| 4,613,749 | 9/1986 | Vali | 250/202 |
| 4,672,190 | 6/1987 | Rostkowski et al. | 318/577 |
| 4,794,540 | 12/1988 | Gutman et al. | 364/474.29 |

Primary Examiner—John R. Lastova
Attorney, Agent, or Firm—Roger W. Jensen

[57] ABSTRACT

Curve following apparatus for providing digital output signals indicative of the mathematical shape and/or location of a curve comprising a scanning means having a large number of individual sensors unitarily grouped together into a two dimensional array so as to define a viewing window, a driving mechanism for holding and driving the scanning means, and processing means for developing and transforming vector components from the output signal of said scanning means and for controlling the position of said scanning means.

18 Claims, 10 Drawing Sheets

FIG. 5A
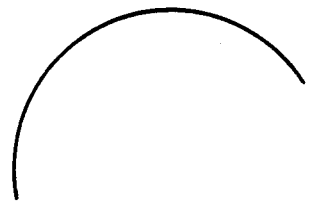
FIG. 5B
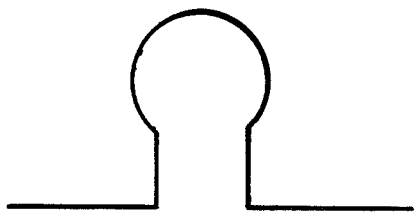
FIG. 5C
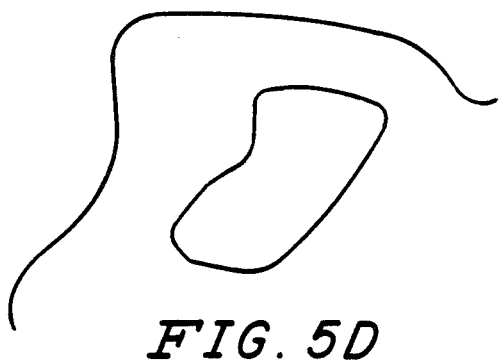
FIG. 5D
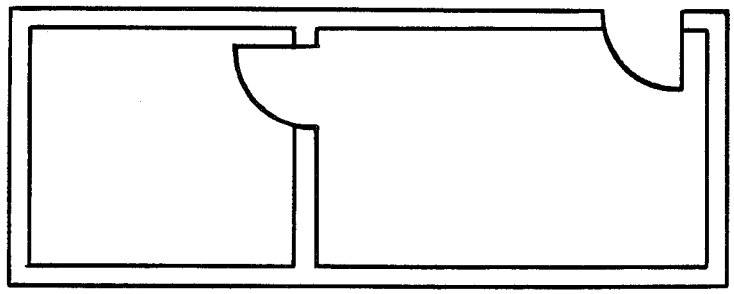
FIG. 5E
FIG. 5

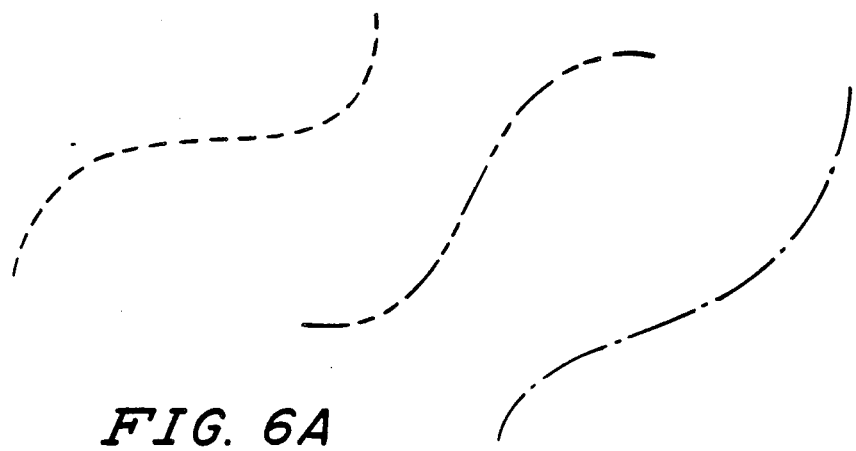
FIG. 6A
FIG. 6B
FIG. 6

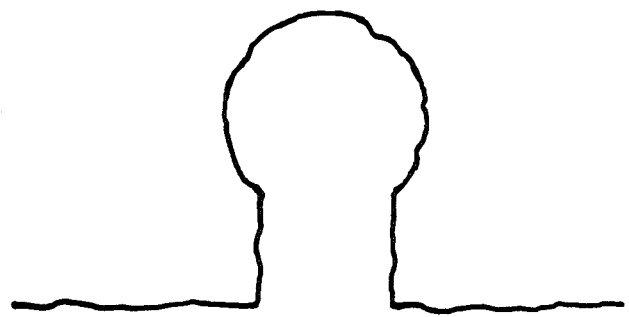
*FIG. 7A*
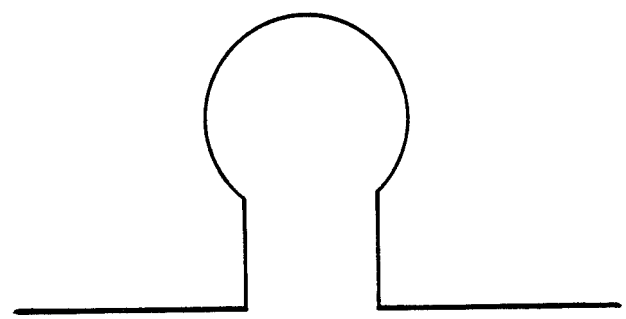
*FIG. 7B*
*FIG. 7*

IS32 OPTICRAM

SENSING ARRAY

CURVE FOLLOWING APPARATUS

BACKGROUND OF THE INVENTION

This invention is an apparatus for automatically following a curve lying substantially in a plane and for producing digital output signals indicative of the mathematical shape and/or location of the curve.

At the outset, it should be understood that the use of the word "curve" is intended to generically cover all lines whether straight or having a finite radius. A straight line, as is well understood, is simply a curve having a radius of infinity.

Prior art curve followers fall into one of two categories. The first are the followers using a single or double sensor to detect points on a line thereby inferring a direction and hence tracking a continuous line. There is no commercially available apparatus utilizing this technique known to the applicant which can be used for digitizing drawings in such a way that they can be readily retrieved and used by computer aided design software. The second category known to the applicant are those line followers that use array sensors and scan the drawing to produce and record digital (raster or pixel) image or picture of the object; which picture can then be analyzed by computer software, e.g., CAD, using image processing, and other techniques such as "edge enhancement" so as to identify geometric shapes and record the shapes in vector format. The resulting vectorizing image is a close approximation of the actual line drawing and consists of a collection of lines and arcs but no "intelligence" is associated with it; the user must then use CAD software to review the resulting picture and assign necessary intelligence to the drawing.

SUMMARY OF THE INVENTION

The present invention takes a completely different approach from all known prior art arrangements. The present invention uses array sensors to track a line image, develops a mathematical representation of the line (satisfying specific application constraints), assigns "real world" coordinate and dimension values as the line is being traced (accounting for scale and orientation), directly converts and stores the mathematical (vectorized) curves in an appropriate format for retrieval by CADD software, assigns attributes (such as elevation or temperature to contours) in accordance with applications specific criteria. My invention is capable of scanning an area according to a predefined search algorithm so as to find a line and then track it. In the preferred embodiment of my invention I teach the use of an optical sensor array sold under the trademark "Optic RAM" by Micron Technology Inc. and a simple lens to view a line on a scale drawing; however, my invention is not limited to optical sensing.

In broad summary terms my invention provides an apparatus for automatically following a curve lying substantially in a plane and for producing digital output signals indicative of the mathematical shape and/or location of said curve, said apparatus comprising (a) scanning means for scanning incremental portions of said curve, (b) a driving mechanism having a holder means and controllable means for incrementally moving said holder means selectively along a first or X axis and also along a second or Y axis perpendicular thereto, said driving mechanism being placable in proximity to said curve, (c) means attaching said scanning means to said holder means for movement therewith, and (d) processing means connected to receive the output signals from the scanning means, the processing means having a connection back to the driving mechanism and also providing one or more outputs to a user and/or user apparatus.

The scanning means of the immediately preceding paragraph is distinguished by having a large number of individual sensors unitarily grouped together into a two dimensional array so as to define a viewing window. The array has a first reference frame of coordinates and a substantially planar face. The scanning means further includes means (following a contact of said planar face of said array with a first portion of said curve) for generating signals of a first sense for those sensors of said array in register with said curve and for generating signals of a second sense for those sensors of said array which are not in register with said curve and means including output mean for producing digital output signals (sometimes hereinafter "bit signals") of the same sense for all of said sensor signals of said first sense.

The aforementioned processing means broadly includes modeler means, coordinate transformer means, data stacker means, mode controller means, command generator means, sensor control means, vectorizor means and storage means.

My invention provides an apparatus with the aforementioned function not truly available in prior art apparatus and furthermore provides such an apparatus with a very fast response time, thus permitting rapid and efficient curve following as will be described in greater detail below. My apparatus is very versatile in that it will follow straight lines, circular arcs, line and arc combinations, open or closed contours (splines), architectural drawings, continuous lines or curves and discontinuous or dashed curves. The apparatus further has the ability to handle a line intersection by noting the point of intersection and stacking that information for future use if desired.

PREFERRED EMBODIMENT OF THE INVENTION

BRIEF DESCRIPTION OF THE DRAWINGS

FIG. 5 are examples of curves and shapes that can be followed or tracked by my apparatus;

FIG. 6 are examples of discontinuous lines that can be traced with my apparatus;

FIG. 7 is an example of a conversion from a hand drawn curve into a machine drawn geometric shape;

DESCRIPTION OF THE PREFERRED EMBODIMENT

Figure 1:
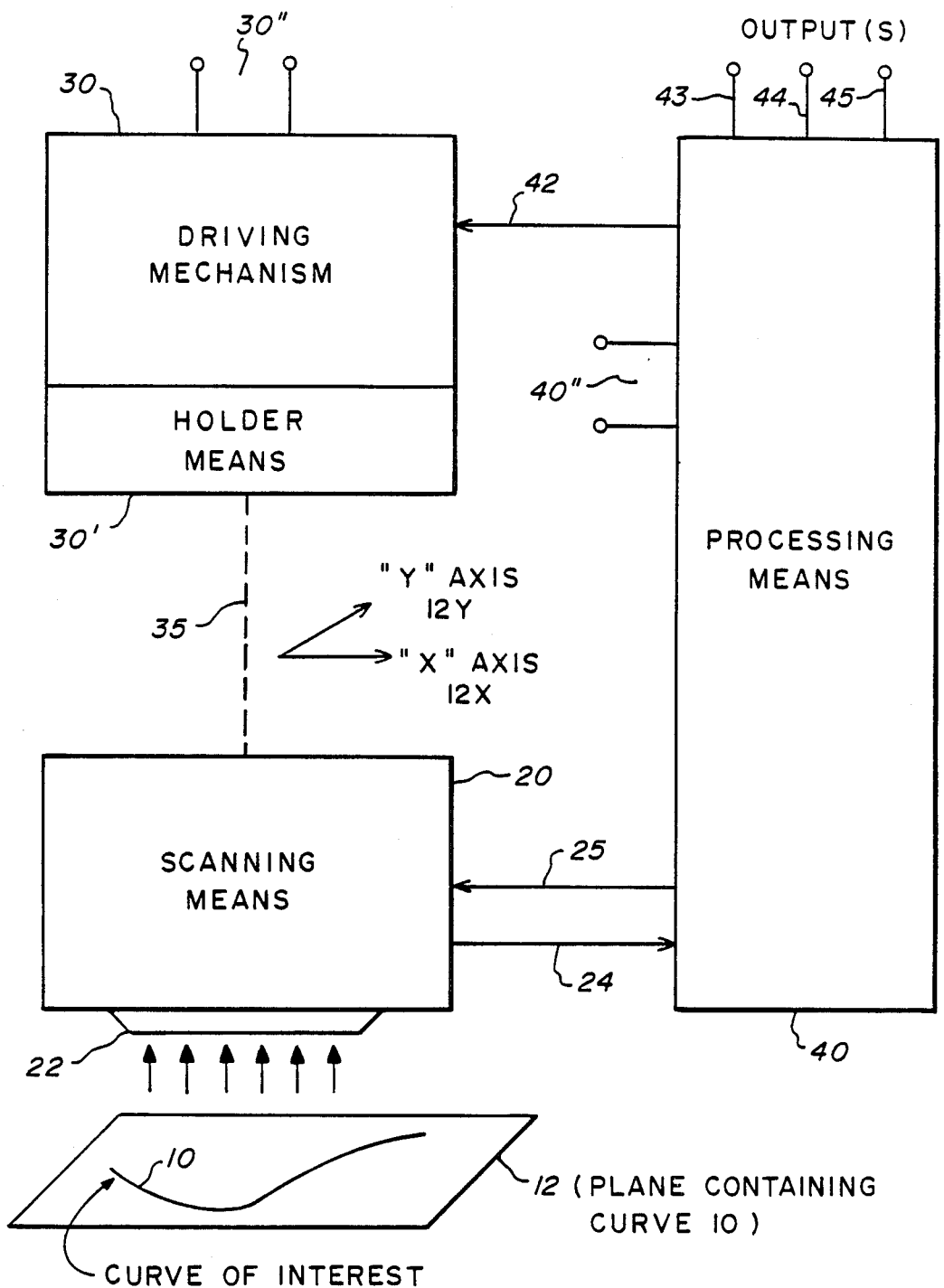
FIG. 1 is a block diagram of the invention.

Turning to FIG. 1, a simplified block diagram of the invention shows an apparatus for automatically following a curve 10 lying substantially in a plane 12 and for producing digital output signals indicative of the mathematical shape and/or location of said curve. In FIG. 1 a scanning means 20 is provided for scanning incremental portions of said curve 10, said scanning means having a large number of individual sensors unitarily grouped together into a two dimensional array, the array being identified by reference numeral 22. The array has a substantially planar face (see FIGS. 10 and 11) and defines a viewing window. A driving mechanism 30 having a holder means 30' is adapted to be controlled for incrementally moving said holder means selectively along a first or X axis 12X and also along a second or Y axis 12Y perpendicular thereto, axes 12X and 12Y defining plane 12. Suitable means 35 are provided for attaching the scanning means 20 to the holder means 30' for movement therewith along said X and Y axes with the planar face of the array 22 (which face is perpendicular to the plane of the paper of FIG. 1) being positioned generally parallel to plane 12. Processing means 40 is provided for receiving an output 24 of scanning means 20, for supplying adjustment signals to scanning means 20 via connection 25, for supplying a controlling input via 42 to the driving mechanism 30, and for having one or more outputs 43, 44 and 45 as aforesaid. Reference numerals 30" and 40" signify appropriate power connections to the driving mechanism 30 and processing means 40 respectively, it being understood that the scanning means would derive its required power as shown from the processing means 40 via connection 25.

Figure 2:
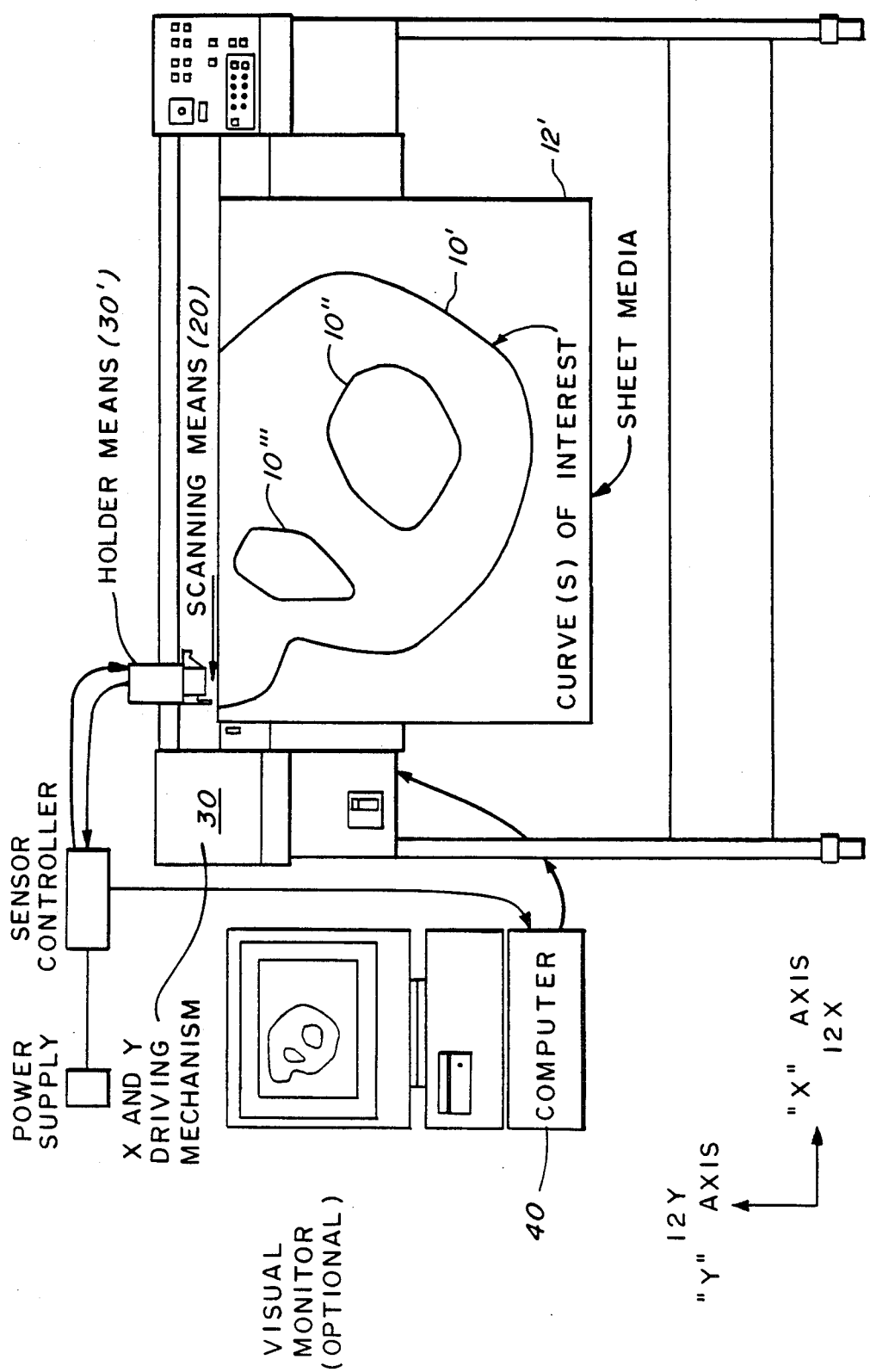
FIG. 2 is a semipictorial view of some of the key elements of my invention.

In FIG. 2 the block diagram system of FIG. 1 is shown in more detail, corresponding apparatus having the same reference numerals. In FIG. 2 the holder means 30' to which is connected the scanning means 20 is adapted to be moved selectively and controllably by an X and Y driving mechanism 30 along X and Y axes 12X and 12Y respectively by a modified plotter apparatus Model 7585B sold by the Hewlitt Packard Co. In FIG. 2 a curve or curves of interest 10', 10" and 10''' are on a sheet media 12' defining plane.

Figure 3:
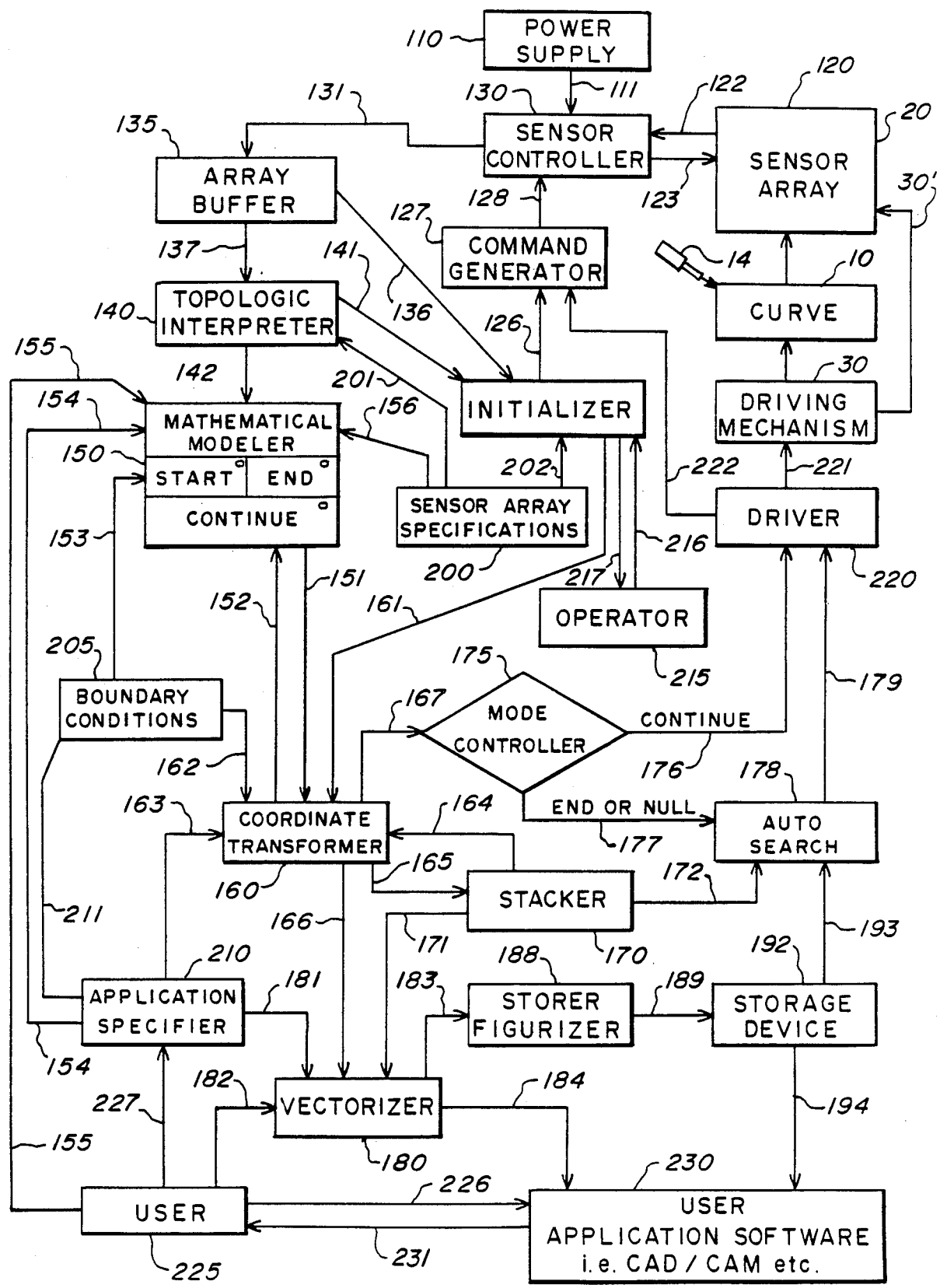
FIG. 3 is a block diagram of my invention showing in considerable detail the individual hardware and/or software and/or operator functions.
Figure 10:
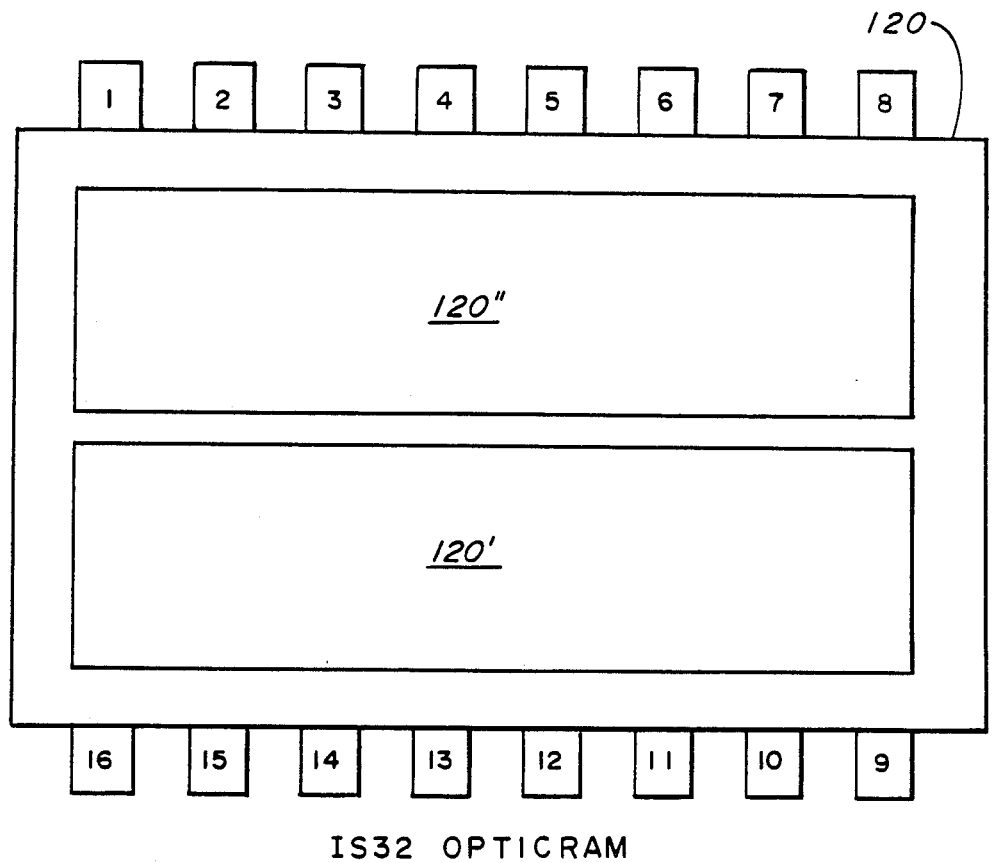
FIG. 10 is a schematic outline showing of an Optic RAM sensor which can be used as the scanning means.
Figure 11:
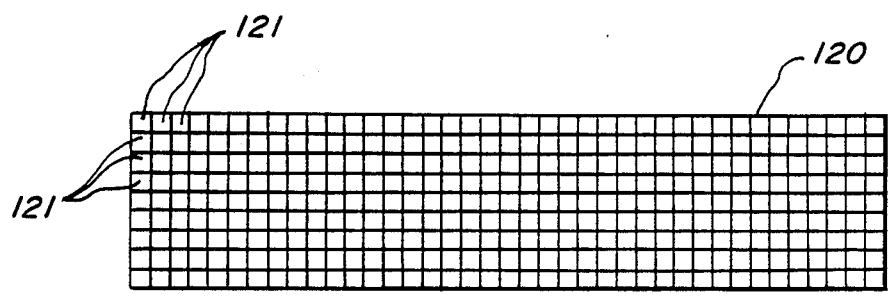
FIG. 11 is a schematic representation of a portion of scanning means of the FIG. 10 showing a large number of individual sensors unitarily grouped together into a two dimensional array.

In FIG. 3 the curve 10 is shown in block diagram form receiving illumination from a light source 14. The scanning means 20 comprises a sensor array 120 which, in the preferred embodiment, comprises a large number of solid state image sensors, a representative example being the IS 32 Optic RAM (trademark) provided by Micron Technology, Inc. of Boise, Id., this specific product having 65,536 elements arranged in dual arrays, each array having 128 by 256 elements arranged in rows. Thus, the scanning means provides a large number of solid state light sensitive image sensors (hereinafter "pixel"). It will be understood by those skilled in the art that such devices, when appropriately energized functions whereby each such pixel has a characteristic at least partially similar to a capacitor, i.e., the capability of being electrically charged and discharged, said pixels being adapted, after first being charged, to discharge as a function of the intensity and duration of light to which the pixel is exposed. FIG. 11 is a schematic showing of the sensing array showing a large number of individual pixels 121 arranged in two dimensional fashion, all of the pixels thus defining a viewing window as shown in FIG. 11. The apparatus shown in FIG. 10 is a general representation of the IS 32 Optic RAM showing dual arrays 120' and 120", each array having 128×256 elements, i.e., a total of 32,768 light sensing elements per array. To understand the operation of the scanning means, it may be assumed that each of said pixels has been initially precharged to a preselected voltage, e.g., 5 volts and thus being adapted to discharge (like a capacitor) towards 0 volts. The pixel/capacitor will discharge at a rate proportional to both the intensity and the duration of the light to which it is exposed.

As stated aforesaid, the scanning means is held by the holder means of the driving mechanism so that the planar face of the scanning means (the plane of the paper of FIGS. 10 and 11) is positioned parallel to the plane 12 which contains the curve 10 of interest. Thus, those pixels which are in register with the curve 10 will receive less light (or more light as the case may be) as compared to the pixels that are not in register with the curve 10.

After a preselected exposure time, the status of each pixel or element in the array is checked by a sensor controller 130; the voltage of each pixel/capacitor is compared with a preselected threshold voltage, e.g., 2.5 volts. In such comparison, if the voltage is greater than the threshold voltage, then the corresponding bit is set to "1", i.e., representing a black line on a white background. On the other hand if, during the comparison, the voltage is less than the preselected threshold value (representing more discharge because of a white reflecting surface) then the bit is "0".

The output from the sensor array 120 is applied via connection 122 to the aforesaid sensor controller 130; another connection 123 is provided between the controller 130 and the sensor array 120. The function of connection 123 is to enable an initializing routine so as to set proper lighting, exposure time and focus all as set by an initializer 125 connected via 126 to a command generator 127 connected in turn by 128 to the sensor controller 130 and thence via 123 to the sensor array. The initializer 125 in turn receives an input from an operator 215 via connection 216, a return connection 217 from initializer 125 to the operator 215 signifying sensor status and thus enabling the operator 215 to interact with the system in establishing desired exposure time. Another input to the initializer 125 is the sensor array specifications module 200, one output of which 202 is applied to the initializer.

The output from the sensor controller 30 is applied via 131 to an array buffer 135, the output of which is applied via 137 to a topologic interpreter 140 having a first output 141 applied to the initializer 125 and a second output 142 applied to a mathematical modeler or modeler means 150 having an output means 151 and a plurality of inputs 152, 153, 154, 155 and 156. Output 151 is applied to a coordinate transformer means 160. Input 152 is applied from coordinate transformer means 160. Input 153 is applied from a boundary condition means 205. Input 154 is applied from an application specifier means 210. Input 155 is applied from a user module 225 and input 156 is applied from the sensor array specification means 200. Sensor array specification means 200 also has an output 201 applied to the topologic interpreter 140.

Additional inputs to coordinate transformer means 160 are input 161 from initializer 125, input 162 from boundary condition means 205, input 163 from application specifier 210, and input 164 from a stacker means 170. Coordinate transformer means 160 has three output means depicted in FIG. 3, namely, an output 165 applied to stacker means 170, an output 166 applied to a vectorizer 180, and an output 167 applied to a mode controller means 175.

The vectorizer means 180 in addition to input 166 as aforesaid has three additional inputs, namely, output 181 from application specifier 210, input 182 from user module 225, and output 171 from stacker 170. Vectorizer 180 has two outputs depicted in FIG. 3. The first is an output 183 applied to a storer figurizer means 188, the output 189 of which is applied to a storage device 192. The other output of the vectorizer means 180 is output 184 which is applied to user apparatus 230 which may be, for example, application software such as CADD/CAM. User apparatus 230 also receives an input from user module 225 via connection 226 and a return connection thereto is designated by means 231.

Application specifier 210 has another input 227 being the output from user module 225; it also has an output 211 applied to the boundary condition means 205.

An auto search module 178 is provided having three inputs, the first being the output 172 from stacker means 170, the second being the end or null output 177 of mode controller 175, and the third being an output 193 of storage device 192; another output 194 of storage device 192 is applied to user apparatus 230.

The mode controller means 175 has a first mode of output, namely, "continue", this output is designated in FIG. 3 by the reference numeral 176 and is applied as one of the two inputs to a driver means 220, the other input to driver means being the output 179 of auto search means 178. A first output 221 of driver 220 is applied to the driving mechanism 30 so as to selectively and controllably move the sensor array along the X and Y axes. The other output 222 of the driver 220 is connected to the command generator 127.

As indicated, before beginning the actual tracing or curve following process, it is desirable to perform the initialization routine so as to determine proper lighting, exposure time and focus. Initializer 125, with the assistance of the input from topological interpreter 140 via output 141, will map the array as received at output 137 of the array buffer 135 to appropriate pixels on the optional computer monitor shown in FIG. 2. The operator (at module 215) then can adjust positioning, lighting, timing and focusing until a clear image is displayed. Those skilled in the art may choose, for some applications, an algorithm devised so that these initial adjustments can be set up automatically and continually adjusted, to the extent required, for best results throughout operation of the apparatus. In addition, initializer 125 determines scale and orientation of the drawing. One method of establishing scale and orientation is to have operator 215 input the coordinates of two known points.

The function of the topologic interpreter 140 is to map the incoming stream of bits in the array buffer 135 into a normalized rectangular array representing the relative physical location of each bit with respect to the overall array/viewing window. Normalization process depends upon the combined characteristics of the sensing array and any special viewing mechanism. This process includes considerations such as lens characteristics and lens enlargement or reduction factors as well as the physical (measured) locations of individual sensors both with respect to the center of view and with respect to lense characteristics, e.g., inverted image, etc. Therefore, distance along the curve are determined in actual (on paper) measurements and relative to the center of view whose coordinates are always known throughout the process. One of the functions of the topologic interpreter is to correct for any image skew which could be caused by the arrangement of the pixels in the sensor array.

Once initialization is complete, the interpreted image is applied at 142 as a input to the mathematical modeler 150 which analyzes the bit pattern and assigns a pair of coordinate values relative to said first reference frame of coordinates to each such bit signal, the coordinate values hereinafter sometimes being referred to as "data points". Thus, the array of the scanning means has a first reference frame of coordinates and, as aforesaid, the modeler means analyzes each such bit signal and assigns a pair of data points to each such bit signal. The modeler means further provides the function of computing curve characteristics which best fit all such data points, this is accomplished by having appropriate software and control means known to those skilled in the art. The modeler means further has output means for providing an output signal indicative of vector components of said computer curve, this output being identified by reference numeral 151 in FIG. 3.

The output of the modeler means at 151 is applied as one of several inputs to coordinate transformer 160, the function of which is to transform said modeler output signal from said first reference frame of coordinates to a second preselected reference frame of coordinates. An example of a second preselected reference frame of coordinates would be geodetic latitude and longitude. Another example would be coordinates in a frame of reference having its origin at a specific corner of a building.

The coordinate transformer means 160 has two outputs. The first 166 is applied to vectorizer 180, the second 165 is applied to stacker 170. In both cases the output signal, i.e., at 165 and 166, is an output signal indicative of said modeler output signal after being transformed to said second preselected reference frame of coordinates.

Boundary conditions means 205 and application specifiers 210 are established through control actions by user module 225; these conditions and specifications are considered by the modeler 150 in order to determine appropriate action under each circumstance encountered during the following of the curve. Examples of such circumstances are: start, end or continue. Examples of user requirements are: only straight lines and circular arcs are to be used to represent the curve (for surveys and subdivision plots), curves start or end at boundaries, continuation is always on a tangency, curves should be splines, curve closure must be on a tangency, observed intersections indicate beginning or end point of curves, etc. In case of conflicts, when modeler 150 cannot make a concrete decision, then user 225 is allowed to interact with the system to resolve the conflict.

After observed points within the viewing window have been modeled, information is passed from the modeler 150 to coordinate transformer 160 which, as aforesaid, transforms the curved coordinate (vector) data to real world or system coordinate values. At times an iteration process may be necessary between transformer 160 and modeler 150 in order to find the best solution; connections 151 and 152 facilitate this iteration process. An example where such iteration process would perhaps be necessary would be in the case of intersecting lines being detected by the scanning mechanism.

Once transformation is complete, any reference points that might be required for future reference are stored in stacker 170. Examples of such points would be intersection points such as point A'C' shown at the junction of two intersecting lines in FIG. 9. The significance of the intersection point is that it may be desired to use such point as the beginning point of the next curve tracing operation. Another example of reference points that might be needed for future references are several points labeled as "starting points" for the contour map depicted in FIG. 8. Such preestablished multiple starting points may be provided by various means at user 225 preference applied as part of application specifier means 210 via 227 and then via 211 to boundary condition 205 and stored in stacker 170 via 162,160 and 165 respectively. User may define such prints either by giving the specific X,Y coordinate values (from computer keyboard or a digitizing tablet, etc.) and the order in which they should be picked. Or by manually manipulating the driving mechanism (after initialization) and locating the center of sensor array on the point of interest then triggering a signal which would cause the system to accept the coordinates of that point and store them in the stacker for future reference such points could also be provided for the result of another user program and stored for retrieval and use by this system.

The output from transformer 160 is also applied to mode controller 175 to determine mode of operation. If the system is in a continuing trace mode, then the information is passed via 176 to the driver 220 which in turn generates proper motion instructions to the driving mechanism 30 to move the scanning means along the X and Y axes a controlled amount to a new viewing position. After the driver has stabilized at such new position, then the driver 220 will trigger the command generator 127 so as to send exposure and bit transfer instructions to controller 130. The process will repeat and repeat as required. If the system has reached the end of a line as specified by boundary conditions 205 and application specifier 210, or if no recognizable line was detected, i.e., a blank window, then mode controller 175 changes from the "continue" mode at output 176 t the end or "null" mode at output 177 connected to auto search means 178.

Auto search 178 uses preselected search algorithms and information from stacker 170 to determine the direction and distance of movement which can lead to discovery of the next line to be traced. Auto search means 178 then transmits such direction and distance information to driver means 220 so as to control the driving mechanism 30 and command generator 127 respectively as described above. This process repeats until a line is discovered or until the system determines another line cannot be found. Auto search 178 also uses information from stacker 170 to determine quickly a specific point to move to; an example of this would be when working with a contour map such as that shown in FIG. 8. Assume that the curve following apparatus had started at starting point 240' of curve 240 depicted in FIG. 8 and had completed following 16 the entire curve. Then, as aforesaid, information from the stacker 170 as applied via 172 to auto search 178 would command the driver 220 to move the driving mechanism so that the viewing window would hover over starting point 230' of the next smaller contour line 230.

Coordinate transformer 160 also passe information via output 166 to vectorizer 180 which utilizes the received information in combination with curve information from previous windows and also in accordance with instructions received from application specifiers 210 via connection 181, boundary condition means 205 and stacker 170 reference points so as to convert the small curve segments and point information into geometrically defined vector form. For example, small contiguous line segments having the same slope are combined into one long line with the same equation so that only two point coordinates need be stored, i.e., one coordinate pair at each end of the resulting composite line. In a similar fashion, if small contiguous curve segments happen to be on the periphery of a circular arc, then they can collectively be represented by a circular arc which can always be reproduced knowing three characteristic points (either three points on the arc or two end points and center), therefore, only three points need be stored for the collection of segments rather than storing data for all or each segment. This is a very important feature of my invention because it significantly reduces system data storage requirements. In case of ambiguous situations, the user module 225 is allowed to interact with the system to resolve the conflict.

Vectorized information from vectorizer 180 can be made available directly via 184 to user application software depicted schematically in FIG. 3 as block 230. Alternatively the vectorized information from vectorizer 180 can be routed via 183 to the storer figurizer 188 (to put it into proper format and file organization, and to include drawing instructions in accordance with the requirements of the software which would be retrieving the information) and thence to the storage device 192 via connection 189. Upon demand information stored in storage device 192 can be transmitted via 194 to the user application software 230.

Figure 8:
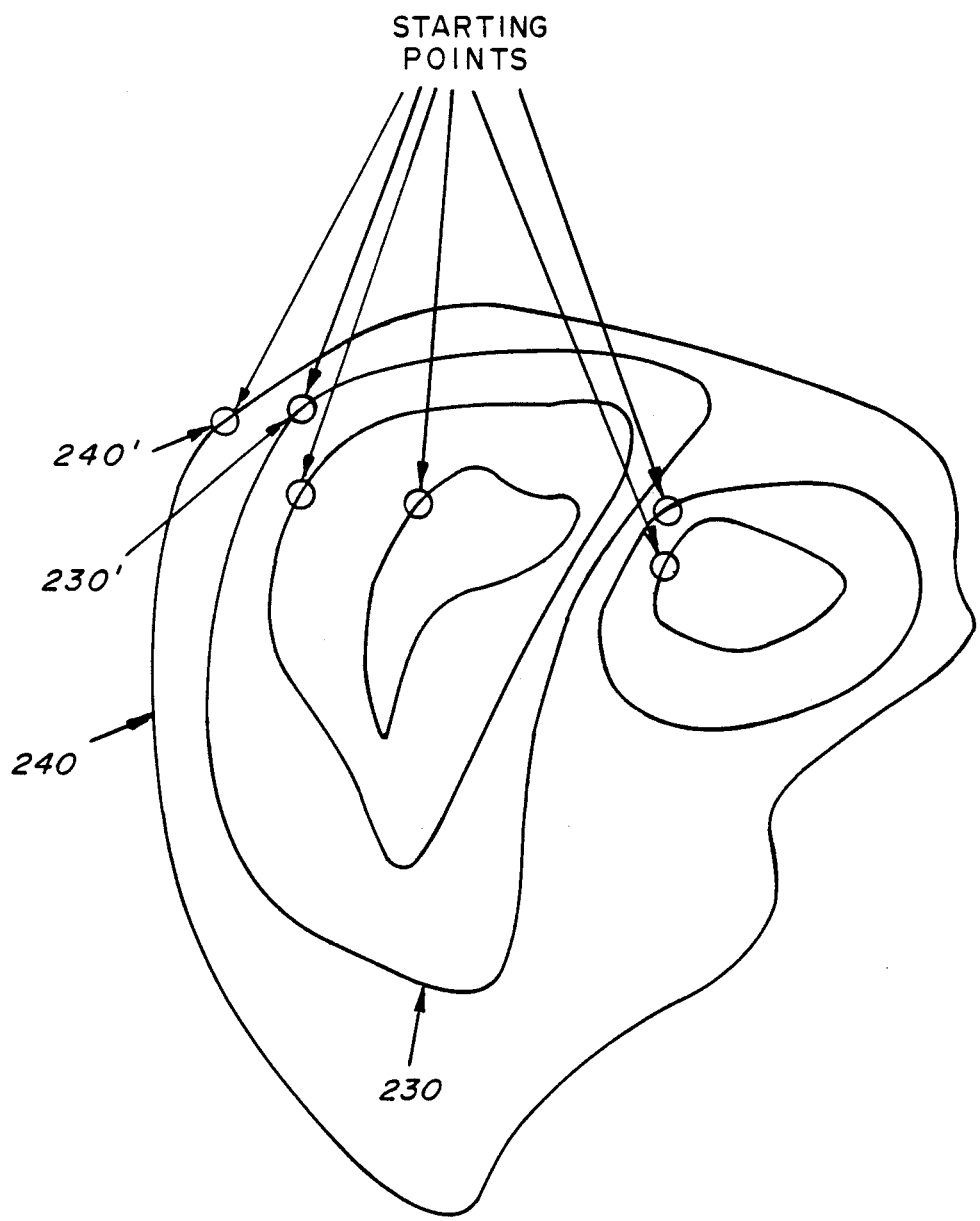
FIG. 8 is a showing of a contour drawing that can be followed by the apparatus provided by my invention.
Figure 9:
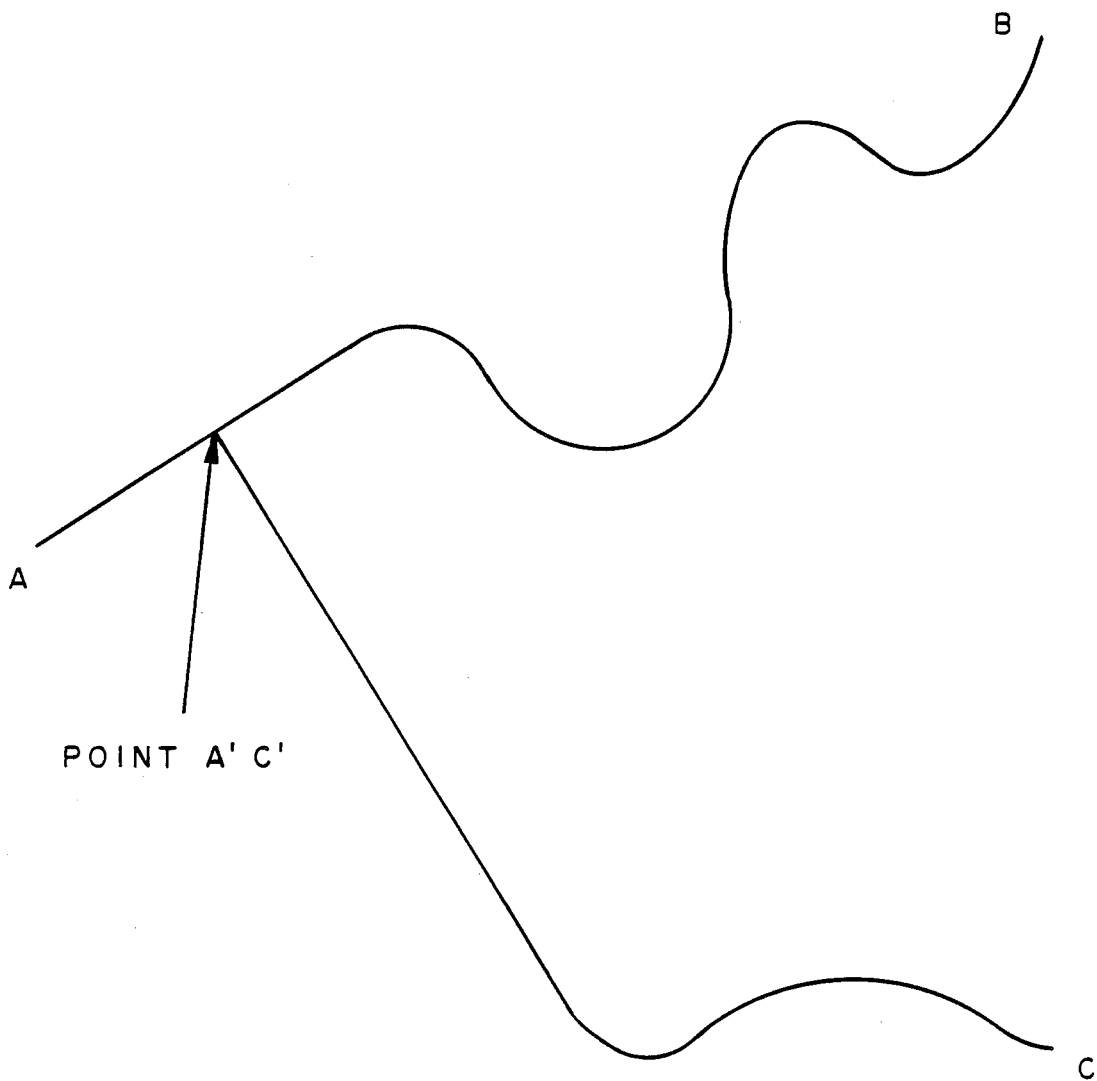
FIG. 9 is a showing of a pair of intersecting lines or curves.

In the case of topographic contour maps such as shown in FIG. 8, vectorized information can be stored in grid or contour form such that it can be recalled by graphics routines for replotting the contours at different scales or for generating three dimensional representations, or by computational programs for earth work computation, etc.

Figure 4:
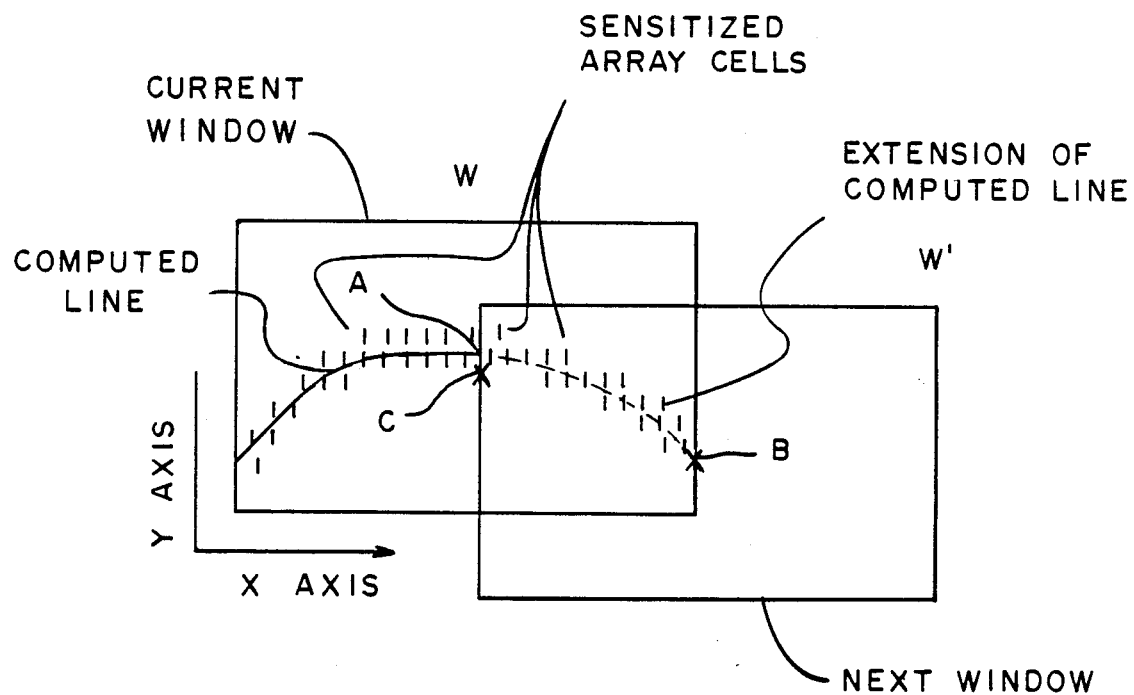
FIG. 4 is an analysis of a line being viewed by the scanning apparatus showing both the current viewing window as well as the next window.

FIG. 4 depicts (within "current" view window W) a computed line, derived from the bit information, where point A represents the end of the line as computed and where computer techniques can be used to detect an extension of the line to a point B at the edge of the view window W. Point B therefore becomes the middle or center of the next window W'. In other words, point B coordinates will be applied from mode controller 175 via 176 to driver 220 and thence to the driving mechanism 30 so as to move the scanning means to a position corresponding to point B being in the center of the next window W'. At that point this additional data will be obtained from the scanning means to determine the actual position or extension of the line. By this technique there is no chance of moving off of the line.

While the above identified Optic RAM type of solid state sensor has been designated for the preferred embodiment of the invention, those skilled in the art will recognize that other sensing techniques can be used within the scope of my invention. The only critical limitation for the scanning means is that the scanning means has a "large number" of individual sensors unitarily grouped together into a two dimensional array so as to define a viewing window. In the case of the IS 32 Optic RAM, as aforesaid, the "large number" of individual sensors is indeed very large, i.e., 65,536 elements. It should be understood that the "large number" can be a much smaller number as compared to the IS 32 Optic RAM. In my invention, the smallest number of sensors which would satisfy the limitation "large number" would be to have the array three sensors wide and tree sensors long, i.e., a minimum number of nine individual sensors grouped together into a two dimensional array so as to define a viewing window. Examples of sensing techniques which those skilled in the art may use in connection with practicing my invention include, but are not necessarily limited to, electromagnetic, pneumatic, radiation, mechanical, capacitive and/or electrostatic; in each case the scanning means would include means (following a contact of the array with a first portion of the curve) for generating signals of a first sense for those sensors of said array in register with the curve and for generating signals of a second sense for those sensors of said array which are not in register with the curve combined with means including output means for producing digital output signals of the same sense for all of said sensor signals of said first sense.

The driving means has been described as driving the scanning means along the X and Y axes. The fundamental function of the driving means is to provide relative motion along the X and Y axes between the curve and the scanning means. For example, one could use the well known arrangement where a plotter would (i) move the scanning means (with respect to the paper including the curve of interest) along the X axis, and (ii) move the said paper (with respect to the scanning means) along the Y axis.

It also will be understood by those skilled in the art that the shape of the viewing window is not limited to a square or rectangular shape; other shapes such as, for example, oval, round may be used.

While my invention has been described above in connection with the preferred embodiment thereof, it will be understood that it is indeed capable of further modification. Therefore, it is intended to cover any and all variations, uses and adaptations as fall within the scope of the invention as defined by the appended claims.

I claim:

1. An apparatus for following a selected curve and for producing digital output signals indicative of said selected curve, said apparatus comprising:

a. scanning means for scanning incremental portions of said selected curve, said scanning means having a number of individual sensors unitarily grouped together into a two dimensional array so as to define a viewing window, said array having (i) a first reference frame of coordinates, and (ii) a substantially planar face, said scanning means further including means (following a contact of said planar face of said array with a first portion of said curve) for generating signals of a first sense for those sensors of said array in register with said curve and for generating signals of a second sense for those sensors of said array which are not in register with said curve and means including output means producing digital output signals of the same sense for all of said sensor signals of said first sense;

b. a driving mechanism having a holder means and controllable means for incrementally moving said holder means selectively along a first (or "X") axis and also along a second (or "Y") axis perpendicular thereto, said driving mechanism being placeable in proximity to said selected curve;

c. means attaching said scanning means to said holder means of said driving mechanism for movement therewith along said X and Y axes with said planar face being positioned adjacent to said selected curve; and d. processing means connected to receive said digital output signals from said output means of said scanning means, said processing means including the following:

(1) modeler means for (i) analyzing each digital output signal and assigning a pair of coordinate values relative to said first reference frame of coordinates to each such digital output signal, (ii) computing a curve, the characteristics of which fit all such pairs of coordinate values, and (iii) having output means for providing an output signal indicative of vector components of said computed curve, (2) coordinate transformer means (i) connected to receive said modeler output signal and to transform said modeler output signal from said first reference frame of coordinates to a second preselected reference frame of coordinates, and (ii) having output means for supplying an output signal indicative of said modeler output signal after being transformed as aforesaid, (3) data stacker means connected to receive said output signal of said coordinate transformer means and adapted to store predetermined reference points of interest, said stacker means having output means for providing an output signal indicative of data stored in said stacker means, (4) extrapolative means including mode controller means connected to receive said output signal of said coordinate transformer means and also having a first output connected to control said driving mechanism whereby said scanning means is selectively controlled to move from scanning said first portion of said selected curve incrementally along said X and/or Y axes to a new position (thereby enabling the scanning of a second portion of said selected curve) as a function of said output signal of said coordinate transformer means, and said mode controller means having a second output, (5) command generator means connected to said driving mechanism and adapted to receive a trigger signal and including means, after said driving mechanism has moved said scanning means to said new position, to thence develop a command signal, (6) sensor controller means connected to said scanning means and to receive said command signal of said command generator means and adapted, after said scanning means has been moved to a new position, as aforesaid, to selectively initiate (i) the generation of a new set of digital output signals of said same sense for all of said sensor signals of said first sense, and (ii) transfer of said new set of digital signals to said processing means, (7) vectorizer means connected to receive the outputs of said coordinate transformer means and said stacker means and adapted to combine contiguous curve segments having the same curvature and said vectorizer means having a first output, and (8) storage means connected to receive said first output of said vectorizer means and being adapted to supply stored data.

2. Apparatus of claim 1 further characterized by including:

a. array buffer means connected to receive said digital output signals from said scanning means and having output means for producing output signals, b. topologic interpreter means connected to receive said output signals from said array buffer means and having output means for producing output signals adapted to be connected to said modeler means, and c. initializer means connected to receive said output from said array buffer means and said topologic interpreter means and having an output connected to said command generator, whereby an initializing routine may be performed to set selected parameters for said scanning means.

3. Apparatus of claim 2 further characterized by said, topologic interpreter functioning to map the digital output signals received by and passed on by said array buffer means into a normalized rectangular array representing the relative physical location of each digital signal, whereby said mapping functions to correct for any image skew.

4. Apparatus of claim 3 further characterized by including means for producing output signals indicative of sensor array specifications, and means connecting said sensor array specification output signal to said initializer means as an input signal thereof.

5. Apparatus of claim 4 further characterized by including means connecting said sensor array specification output signal to said modeler means as an input signal thereof.

6. Apparatus of claim 4 further characterized by including means connecting said sensor array specification output signal to said topologic interpreter means as an input signal thereof.

7. Apparatus of claim 1 further characterized by including a. application specification means having first, second, third and fourth output means and being adapted to be selectively adjusted so as to generate preselected output signals (at said first, second, third and fourth output means thereof) indicative of preselected application specifications, and b. means connecting said first output means of said application specification means to said modeler means so that an output signal indicative of said preselected application specification is applied as a control signal to said modeler means.

8. Apparatus of claim 7 further characterized by including:

a. boundary condition means connected to receive one of said output signals indicative of said preselected application specification, and having two output means, and b. means connecting one of said output means of said boundary condition means to said coordinate transformer means as an input thereof.

9. Apparatus of claim 8 further characterized by including means connecting the other of said output means of said boundary condition means to said modeler means as a control signal thereof.

10. Apparatus of claim 7 further characterized by including means for connecting said preselected signal at one of said output means of said application specification means to said coordinate transformer means as an input control signal thereof.

11. Apparatus of claim 7 further characterized by including means for connecting said preselected signal at one of said output means of said application specification means to said vectorizer means as an input control signal thereto.

12. Apparatus of claim 1 further characterized by said scanning means individual sensors each comprising a solid state light sensitive image pixel, each such pixel having a characteristic partially similar to a capacitor, i.e., capability of being electrically charged and discharged, said pixels being adapted, after first being charged, to discharge as a function of the intensity and duration of light to which the pixel is exposed.

13. Apparatus of claim 12 further characterized by said scanning means further including means, following a predetermined exposure of said array to said first portion of said curve, for comparing the charge on each pixel with a preset threshold reference voltage and for assigning digital signals to the outputs of all said pixels.

14. Apparatus of claim 13 further characterized by said scanning means assigning a digital signal of a first sense to the output of pixels discharged below said threshold and a digital signal of a second sense to the output of pixels discharged above said threshold.

15. An apparatus for following a selected curve and for producing digital output signals indicative of said selected curve, said apparatus comprising:

a. scanning means for scanning incremental portions of said selected curve, said scanning means having a number of individual sensors unitarily grouped together into a two dimensional array so as to define a viewing window, said scanning means further including means (following registration of said viewing window with a first portion of said selected curve) for generating signals of a first sense for those sensors of said array in register with said selected curve and for generating signals of a second sense for those sensors of said array which are not in register with said selected curve and means including output means producing digital output signals for all of said sensor signals of said first sense;

b. processing means connected to receive said digital output signals from said output means of said scanning means, said processing means comprising modeler means having (i) means for analyzing each said digital output signal and assigning a pair of coordinate values relative to a first reference frame of coordinates to each such digital output signal, (ii) computing means for computing non-linear curves as a function of applied input data, said computing means being connected to receive input data indicative of said pairs of coordinate values and having an output indicative of a computed curve fitting said input data indicative of said pairs of coordinate values, (iii) output means for providing an output signal indicative of vector components of said computed curve; and (iv) extrapolative means connected to receive said output signal of said output means of said modeler means and to move said viewing window to a new position in register with a portion of said computed curve.

16. Apparatus of claim 15 further characterized by including a driving mechanism having a holder means and controllable means for incrementally moving said holder means selectively along a first axis and also along a second axis at an angle thereto, said driving mechanism being placeable in proximity to said selected curve, and means attaching said scanning means to said holder means whereby said viewing window is positioned adjacent to said selected curve.

17. Apparatus of claim 15 further characterized by said new position of said viewing window being selected so that the center of said viewing window is substantially centered over one of the ends of said computed curve.

18. Apparatus of claim 15 further characterized by the center of said viewing window in said new position being in register with an intersection of said computed curve and an edge of said viewing window when positioned to be in register with said first portion of said selected curve.

* * * * *